United States Patent [19]

Garwood, Jr. et al.

[11] Patent Number: 5,313,984
[45] Date of Patent: May 24, 1994

[54] MULTI-FLUID, VARIABLE SEQUENCE, ZERO DEAD VOLUME VALVE AND SYSTEM

[75] Inventors: Gerald A. Garwood, Jr.; Scott M. Taylor, both of Santa Barbara, Calif.

[73] Assignee: Santa Barbara Research Center, Goleta, Calif.

[21] Appl. No.: 951,645

[22] Filed: Sep. 24, 1992

[51] Int. Cl.⁵ ............................................. F10K 11/00
[52] U.S. Cl. ............................. 137/625.48; 137/625; 137/625.4
[58] Field of Search ................. 137/625, 625.17, 625.4, 137/625.48

[56] References Cited

U.S. PATENT DOCUMENTS

| | | | |
|---|---|---|---|
| 3,473,571 | 10/1969 | Dugay | 137/625.4 |
| 4,191,213 | 3/1980 | Dolling et al. | 137/625.17 |
| 4,284,103 | 8/1981 | Pemberton | 137/625.48 X |

*Primary Examiner*—John C. Fox
*Attorney, Agent, or Firm*—W. C. Schubert; W. K. Denson-Low

[57] ABSTRACT

A supply valve includes a first valve member formed with a plurality of ports which communicate with containers of different fluids, and a second valve member having a single port which communicates with an inlet of a chamber into which the fluids are selectively supplied. The second valve member sealingly and slidingly engages with the first valve member, and is movable by a computer-controlled motor drive relative thereto in two directions to positions in which the port of the second valve member communicates with the ports of the first valve member respectively. Each position has unique coordinates in the two directions such that the fluids can be selected in any sequence. In one embodiment, the first valve member is a cylinder having a bore with an axis and the second valve member is a piston which is coaxially received in the bore, and the two directions are rotation above the axis and translation along the axis respectively. In another embodiment, the first and second valve members are blocks having flat mating surfaces, and the two directions are translation parallel to the mating surfaces in two orthogonal directions respectively. Additional elongated parts may be provided into which cleaning fluid is supplied to clean the surfaces of the valve members during movement between the positions.

22 Claims, 9 Drawing Sheets

MULTI-FLUID, VARIABLE SEQUENCE, ZERO DEAD VOLUME VALVE AND SYSTEM

BACKGROUND OF THE INVENTION

1. Field of the Invention

The present invention generally relates to fluid valves, and more specifically to a fluid valve having a plurality of inlet ports and a single outlet port or vice-versa, and a fluid supply system incorporating the valve.

2. Description of the Related Art

It is necessary in many applications to selectively connect one of a plurality of inlet ports which receive different fluids (liquids and/or gasses) to a single outlet port, or alternatively to selectively connect a single inlet port to one of a plurality of outlet ports. This has been accomplished in the past by connecting a plurality of discrete valves to a manifold or by means of a linear or rotary multi-port sequence valve.

The manifold system is disadvantageous in that volumetric dead spaces are inherent in the design which are difficult or impossible to purge. For this reason, manifold valves cannot be used in applications requiring selective supply of incompatible fluids such as solvents and acids.

Sequence valves can be designed with essentially no dead spaces. However, the ports can only be switched in a fixed sequence which is determined by the linear or rotary port arrangement.

SUMMARY OF THE INVENTION

In a multi-fluid valve system embodying the present invention, a supply valve includes a first valve member formed with a plurality of ports which communicate with containers of different fluids, and a second valve member having a single port which communicates with an inlet of a chamber into which the fluids are selectively supplied.

The second valve member sealingly and slidingly engages with the first valve member, and is movable by a computer-controlled motor drive relative thereto in two directions to positions in which the port of the second valve member communicates with the ports of the first valve member respectively. Each position has unique coordinates in the two directions such that the fluids can be selected in any sequence.

In one embodiment, the first valve member is a cylinder having a bore with an axis and the second valve member is a piston which is coaxially received in the bore, and the two directions are rotation about the axis and translation along the axis respectively. In another embodiment, the first and second valve members are blocks having flat mating surfaces, and the two directions are translation parallel to the mating surfaces in two orthogonal directions respectively.

Additional elongated ports may be provided into which cleaning fluid is supplied to clean the surfaces of the valve members during movement between the positions. An effluent valve may also be provided which is essentially similar to and operates in tandem with the supply valve to discharge the fluids from the chamber into respective effluent containers.

The present valve system is advantageous over the prior art manifold and sequential valve arrangements in that there are essentially no dead spaces, and different classes of incompatible fluids such as solvents and acids can be selectively supplied using one valve. Fluids can be selected in any order, or even skipped. Where an effluent valve is provided in addition to the supply valve, the effluents, including hazardous materials, can be safely segregated and recycled.

Operation of the valve by computer-controlled motors eliminates operator errors, enables precise repeatability of process steps and enhances process safety.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
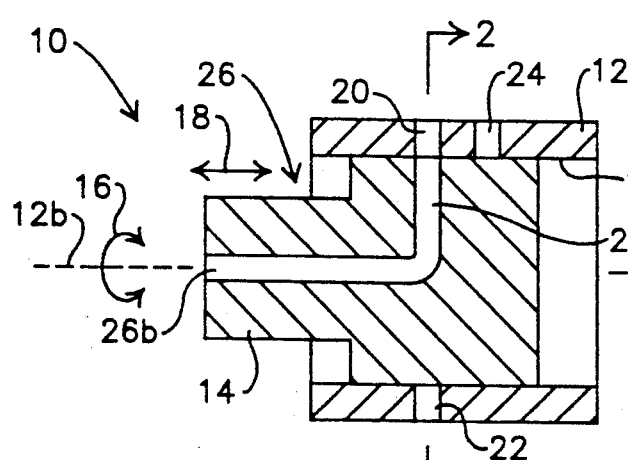
FIG. 1 is a longitudinal sectional view illustrating a first embodiment of a multi-fluid supply valve according to the present invention in a first position.
Figure 2:
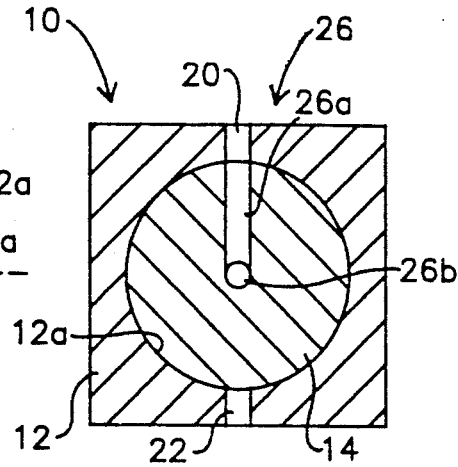
FIG. 2 is a section taken on a line 2—2 of FIG. 1.

As illustrated in FIGS. 1 and 2, a multi-fluid valve 10 embodying the present invention includes a first valve member in the form of a cylinder 12 having a bore 12a with an axis 12b, and a second valve member in the form of a piston 14 which is coaxially and sealingly received in the bore 12a. The piston 14 is slidable relative to the cylinder 12 in a first direction which is rotation about the axis 12b as indicated by an arrow 16, and in a second direction which is translation along the axis 12b as indicated by an arrow 18. It is within the scope of the invention to produce relative movement between the cylinder 12 and piston 14 by fixing the cylinder 12 and moving the piston 14, by fixing the piston 14 and moving the cylinder 12, or by moving both the cylinder 12 and the piston 14.

The cylinder 12 is formed with first, second and third ports 20, 22 and 24 respectively in the form of holes which open into the bore 12a. In the exemplary illustrated arrangement, the second port 22 is spaced by 180° in rotation and zero in translation from the first port 20, and the third port 24 is spaced by 0° in rotation and a predetermined distance in translation from the first port 20.

The piston 14 is formed with a fourth port 26 including a radial hole 26a, and an axial hole 26b which communicates with the radial hole 26a at its right end and is open at its left end as viewed in FIG. 1. The radial hole 26a of the fourth port 26 is movable into selective communication with the first, second and third ports 20, 22 and 24 respectively. Different fluids (liquids and/or gasses) may be supplied to the ports 20, 22 and 24, in which case one of the fluids is selected to flow out the open end of the axial hole 26b of the port 26. Alternatively, a single fluid may be supplied to the open end of the axial hole 26a for distribution to a selected one of the ports 20, 22 and 24.

The axial spacing between the ports 20 and 24 is made larger than the diameter of the radial hole 26a to prevent the hole 26a from communicating with both ports 20 and 24 simultaneously. This also enables the fluids to be selected in any order, and further enables fluids to be skipped if desired.

The valve 10 is illustrated in a first position in FIGS. 1 and 2, with the radial hole 26a of the port 26 of the piston 14 aligned with the first port 20 of the cylinder 12. A fluid communication passageway is formed through the axial hole 26b, radial hole 26a and port 20 through which fluid can flow in either direction.

Figure 3:
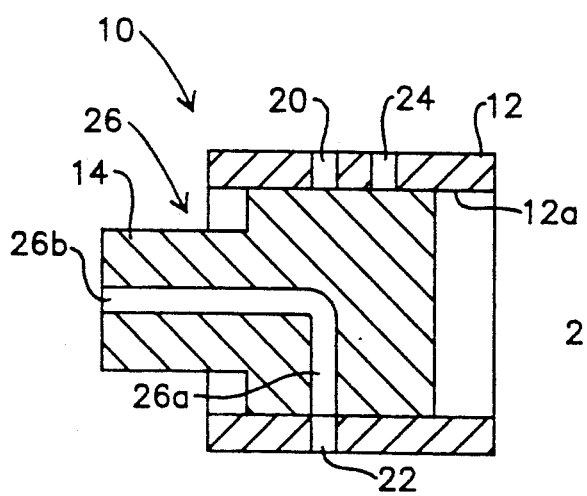
FIGS. 3 and 4 are similar to FIG. 2, but illustrate the valve in second and third positions respectively.

The valve 10 is illustrated in a second position in FIG. 3, in which the radial hole 26a is aligned with the second port 22. The piston 14 is moved relative to the cylinder 12 in the first direction (clockwise or counterclockwise rotation) between the first and second positions.

Figure 4:
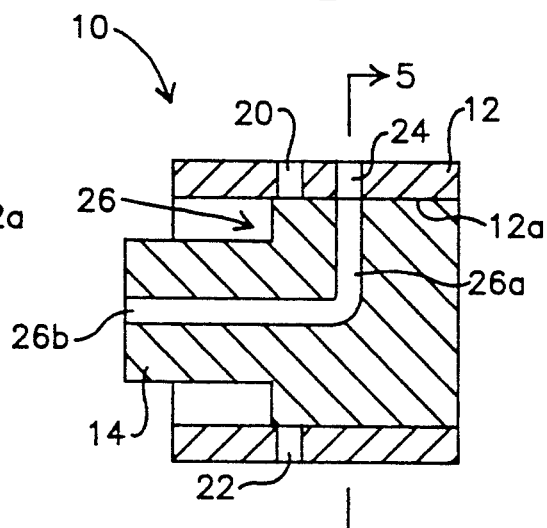

The valve 10 is illustrated in a third position in FIG. 4, in which the radial hole 26a is aligned with the third port 24. The piston 14 is moved relative to the cylinder 12 in the second direction (rightward translation) from the first position to the third position and vice-versa.

Figure 5:
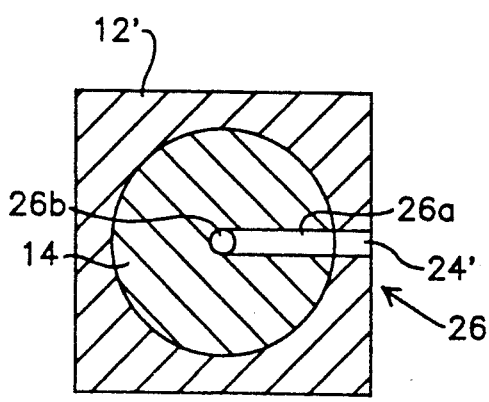
FIGS. 5 and 6 are sectional views taken through the position of a line 5—5 of FIG. 4, but illustrate modifications of the valve respectively.
Figure 6:
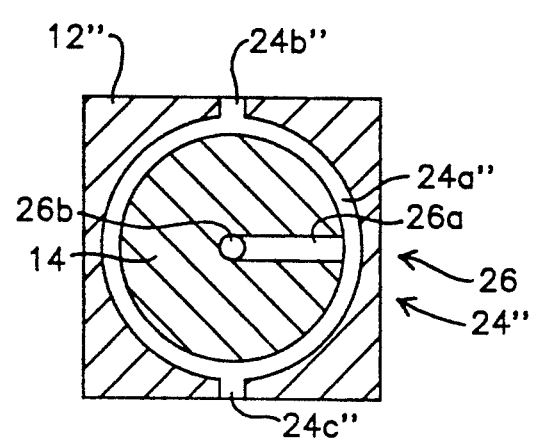

The invention is not limited to the exemplary embodiment illustrated in FIGS. 1 to 4. In FIG. 5, a third port, designated as 24', is spaced by 90° from the first port 20 in a modified cylinder 12' in addition to being spaced from the first port 20 in translation. In FIG. 6, a third port, designated as 24", includes a right circular groove 24a" formed in the inner circumference of a modified cylinder 12", and a hole 24b" which communicates with the groove 24a".

As illustrated in FIG. 6, the radial hole 26a is shown as being in a third position which is axially aligned with the groove 24a" and rotated by 90° relative to the holes 20 and 22 (moved in both the first and second directions from the first position). It will be understood, however, that when the radial hole 26a is translated into axial alignment with the groove 24a", the hole 26a will communicate with the hole 24b" through the groove 24a" at any rotational position of the piston 14 relative to the cylinder 12". For example, the port 26 can be connected to the port 24" by translating the piston 14 rightwardly from the second position of FIG. 3 into alignment with the groove 24a" without rotation.

Further illustrated in FIG. 6 is an additional hole 24c" which communicates with the groove 24a". One of the holes 24b" and 24c" can be connected to a fluid supply and the other to a fluid drain (not shown) to enable a constant flow of fluid through the groove 24a".

Figures 7, 8:
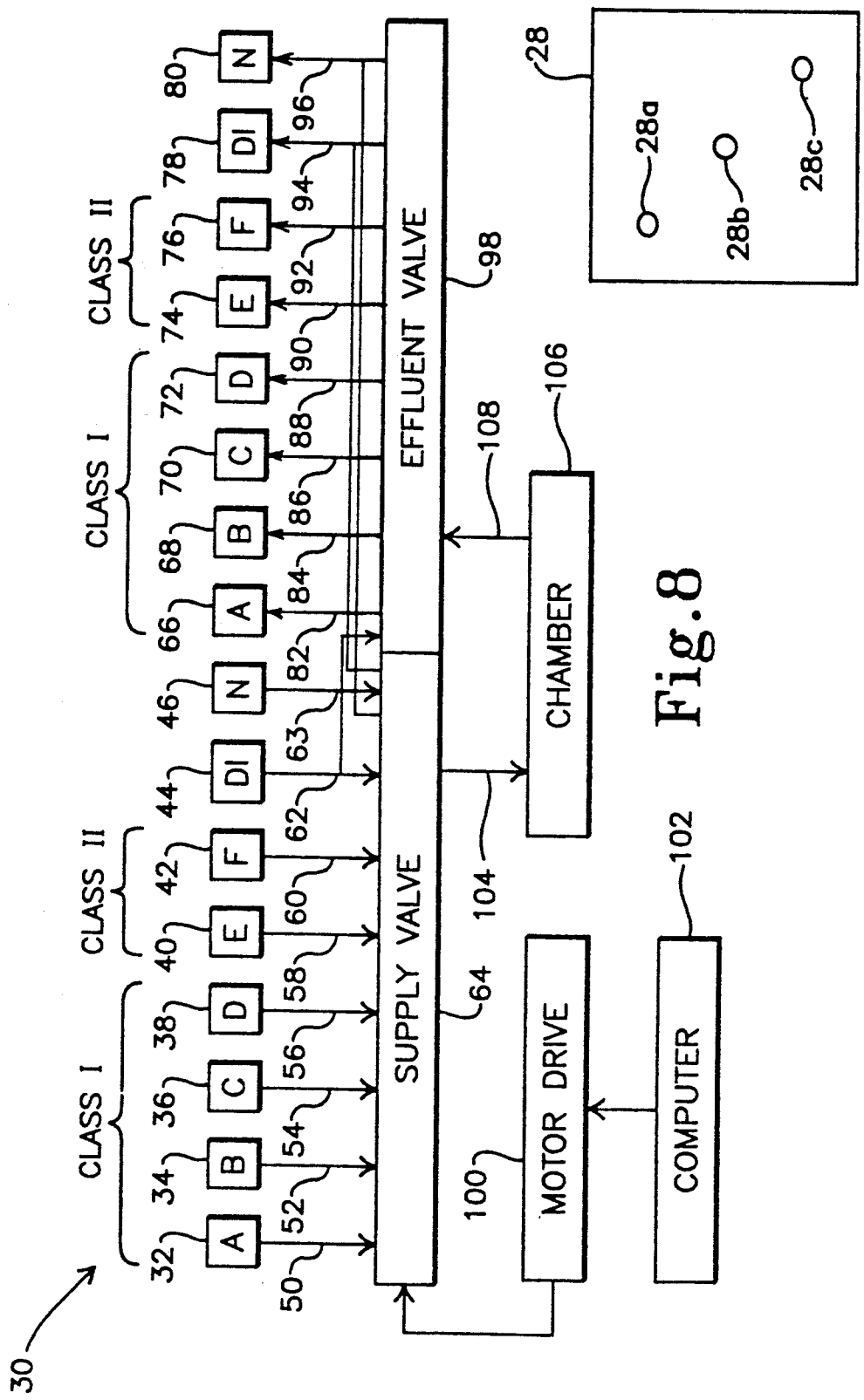
FIG. 7 is side elevational view illustrating another modification of the valve.
FIG. 8 is a diagram illustrating a multi-fluid supply and effluent capture system embodying the present invention.

It will be further understood that the ports 20, 22 and 24 can be spaced from each other in both rotation and translation in any arbitrary arrangement, as long as they are sufficiently far apart that the port 26 will communicate with only one of the ports 20, 22 and 24 in any position. When the piston 14 is moved to a position in which the port 26 does not communicate with any of the ports 20, 22 and 24, all of the ports 20, 22, 24 and 26 are blocked. FIG. 7 illustrates a modified cylinder 28 including ports 28a, 28b and 28c which are all spaced from each other in both rotation and translation.

In accordance with the present invention, each port 20, 22 and 24 of the first valve member (cylinder 12) has a unique set of coordinates in the first and second directions (rotation and translation respectively) such that the port 26 can be selectively connected to the ports 20, 22 and 24 in any desired sequence. This constitutes a substantial improvement over the prior art linear and rotary sequential valves in which the ports can only be connected in a fixed sequence. In addition, the present valve 10 has essentially no volumetric dead space, constituting a substantial improvement over the prior art manifold valve arrangement.

FIG. 8 illustrates a multi-fluid supply and effluent capture system 30 embodying the present invention. The system 30 includes fluid supply containers 32, 34, 36 and 38 for containing different fluids A, B, C and D of a class I such as solvents, containers 40 and 42 for containing different fluids E and F of a class II such as acids, a container 44 for containing a cleaning fluid such as deionized (DI) water and a container 46 for containing a non-reactive pressurizing gas such as nitrogen. The containers 32, 34, 36, 38, 40, 42, 44 and 46 are connected to supply ports 50, 52, 54, 56, 58, 60, 62 and 63 of a multi-fluid supply valve 64 respectively through suitable tubing or conduits (not designated).

The system 30 further includes effluent containers 66, 68, 70, 72, 74, 76, 78 and 80 for receiving and capturing the fluids from the containers 32, 34, 36, 38, 40, 42, 44 and 46 as effluents respectively. The containers 66, 68, 70, 72, 74, 76, 78 and 80 are connected to effluent ports 82, 84, 86, 88, 90, 92, 94 and 96 of a multi-fluid effluent valve 98 respectively through suitable tubing or conduits (not designated).

The supply valve 64 and effluent valve 98 are integrally actuated in tandem by a two-axis motor drive 100 under control of a computer 102 in a sequence which is programmed into the computer 102. The supply valve 64 has an outlet port 104 which opens into a chamber 106 into which the fluids from the containers 32, 34, 36, 38, 40, 42, 44 and 46 are to be selectively supplied. The effluent valve 98 has an inlet port 108 for receiving fluids from the chamber 106 after they have been used in a desired processing step. An exemplary use for the system 30 is wet chemical surface processing of material objects such as semiconductor wafers supported in the chamber 106, although the invention is not so limited.

As illustrated in FIGS. 9 to 13, a tandem multi-fluid valve 109 including the supply valve 64 and effluent valve 98 are constructed and operate in accordance with the principles described with reference to FIGS. 1 to 7 and, in combination, include a cylinder 110 formed with a bore 110a having an axis 110b. A piston 112 is coaxially received in and sealingly slidable relative to the cylinder 110 in a first direction which is rotation about the axis 110b as indicated by an arrow 114, and in a second direction which is translation along the axis 110b as indicated by an arrow 116 using the motor drive 100 under control of the computer 102.

Figure 10:
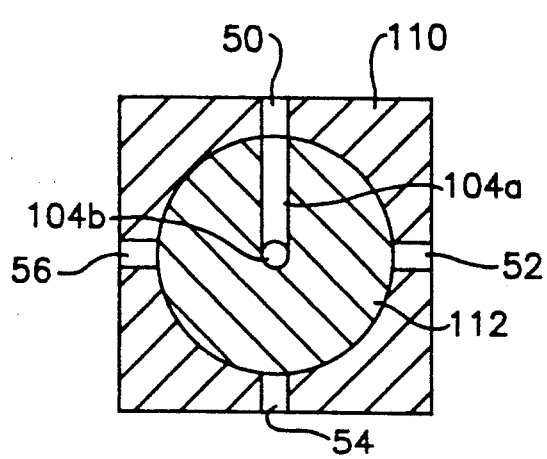
FIGS. 10, 11, 12 and 13 are sectional views taken on lines 10—10, 11—11, 12—12 and 13—13 of FIG. 9 respectively.

The supply ports 50, 52, 54 and 56 for the class I fluids are formed as holes through the cylinder 110 which open into the bore 110a, and are rotationally spaced by 90° from each other as best seen in FIG. 10. The ports 50, 52, 54 and 56 constitute a first "deck" 118 of ports for the class I fluids which have the sane translational position and different rotational positions.

Figure 13:
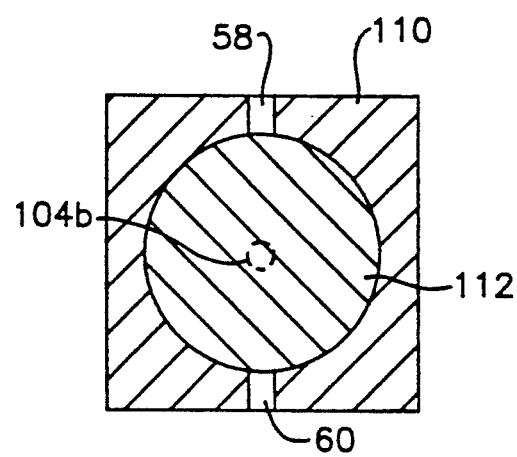

The ports 58 and 60 for the class II fluids are also formed as holes which open into the bore 110a, and are rotationally spaced from each other by 180° as best seen in FIG. 13. The ports 58 and 60 constitute a second deck 120 of ports for the class II fluids which have the same translation position and different rotational positions, with the second deck 120 being spaced in translation (rightwardly) from the first deck 118.

Figure 11:
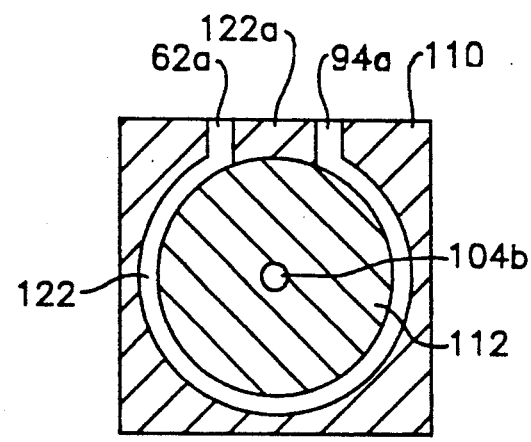

Right circular grooves 122, 124, 126 and 128 are formed in the inner periphery of the bore 110a. As illustrated in FIG. 11, the supply port 62 includes a hole 62a which opens into the groove 122, and the effluent port 94 for the DI water includes a hole 94a which also opens into the groove. This arrangement enables DI water from the container 44 to flow continuously through the hole 62a, groove 122 and hole 94a to the container 78. Although not visible in the drawing, supply and effluent holes corresponding to the holes 62a and 94a respectively are provided for the grooves 124, 126 and 128.

Figure 12:
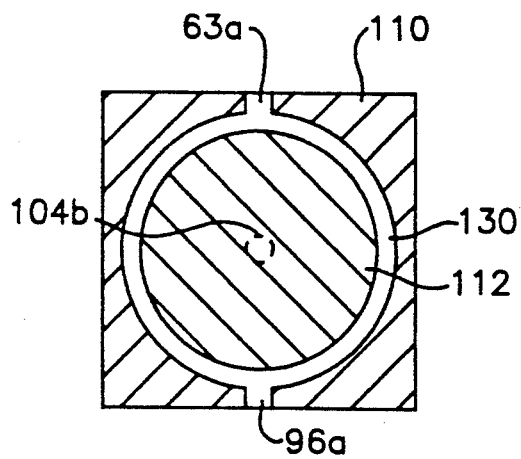

The supply port 63 for the nitrogen gas includes a hole 63a which opens into a right circular groove 130 formed in the inner periphery of the cylinder 110. The effluent port 96 for the nitrogen gas includes a hole 96a which opens into the groove 130. This enables nitrogen gas to flow continuously from the container 46 through the hole 63a, groove 130 and hole 96a to the container 80. The hole 63a, groove 130 and hole 96a are illustrated in FIG. 12.

The grooves 122 and 124 are located on the opposite sides of the first deck 118, whereas the grooves 126 and 128 are located on the opposite sides of the second deck 120. The groove 130 is located between the grooves 124 and 126.

The outlet port 104 includes a radial hole 104a and an axial hole 104b formed through the piston 112. The right end of the hole 104b communicates with the hole 104a and the left end of the hole 104b is connected to the chamber 106.

The supply valve 64 includes a left portion 110c of the cylinder 110, a left portion 112a of the piston 112, and the respective ports. The effluent valve 98 includes a right portion 110d of the cylinder 110, a right portion 112b of the piston 112, and the respective ports, and has the same configuration as the corresponding elements of the supply valve 64. More specifically, the ports and grooves of the effluent valve 98 have the same relative positions as the corresponding ports and grooves of the supply valve 64 such that the valves 64 and 98 operate in tandem. When the supply valve 64 connects the outlet port 104 to the supply port 50, 52, 54, 56, 58, 60, 62 or 63, the effluent valve 98 connects the inlet port 108 to the effluent port 82, 84, 86, 88, 90, 92, 94 or 96 respectively.

The effluent ports 82, 84, 86 and 88 for the class I fluids are arranged in a third deck 132 which is essentially similar to the first deck 118. The effluent ports 90 and 92 for the class II fluids are arranged in a fourth deck 134 which is essentially similar to the second deck 120.

The supply port 62 for the DI water further includes right circular grooves 136, 138, 140 and 142 and, although not visible in the drawing, holes corresponding to the hole 62a which open into the grooves 122, 124, 126 and 128 respectively in the manner illustrated in FIG. 11. The effluent port 94 for the DI water further includes holes corresponding to the hole 94a, which are similarly not visible in the drawing, which open into the grooves 136, 138, 140 and 142 respectively.

The supply port 63 for the nitrogen gas further includes a hole 63b which opens into a right circular groove 144. The effluent port 96 for the nitrogen gas further includes a hole 96b which opens into the groove 144. The inlet port 108 includes a radial hole 108a and an axial hole 108b which are essentially similar to the holes 104a and 104b.

Figure 9:
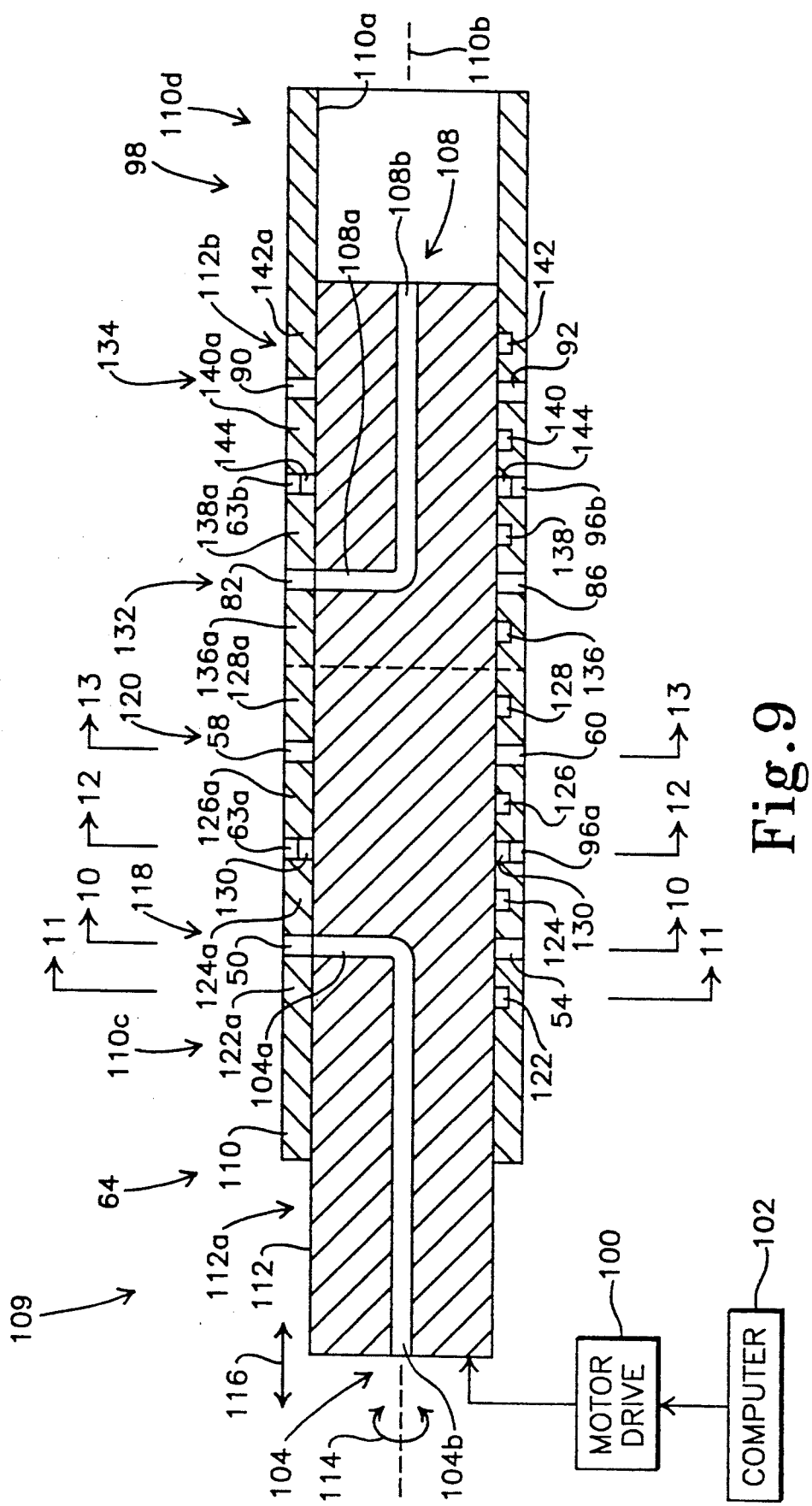
FIG. 9 is a longitudinal sectional view illustrating a first embodiment of a tandem supply and effluent valve for the system of FIG. 8.

The class I fluids from the containers 32, 34, 36 and 38 can be selectively supplied into the chamber 106 by translating the piston 112 such that the hole 104a is aligned with the first deck 118 and the hole 108a is aligned with the third deck 132 as illustrated in FIG. 9. The piston 112 is then rotated to connect the ports for the selected fluid to the chamber 106. The selected fluid flows from the selected supply container 32, 34, 36 or 38 through the supply valve 64, chamber 106 and effluent valve 98 to the respective effluent container 66, 68, 70 or 72.

The operation is essentially similar for supplying a selected class II fluid from the container 40 or 42 into the chamber 106. In this case, the piston 112 is translated such that the holes 104a and 108a are aligned with the second and fourth decks 132 and 134 respectively.

The grooves 122, 124, 126, 128, 136, 138, 140 and 142 are continuously filled with a flow of DI water which is used as a cleaning fluid for the piston 112. As the piston 112 is translated such that the holes 104a and 108a move between the decks 118,120 and 132,134 respectively, the surface of the piston 112 moves relative to the grooves 122, 124, 126, 128, 136, 138, 140 and 142 and any class I or class II fluid is washed off the surface of the piston 112 by the flow of DI water therein and transported to the container 78.

The grooves 130 and 144 are filled with nitrogen gas at a pressure which is higher than the pressure in any of the containers 32, 34, 36, 38, 40, 42 and 44. This overpressure positively separates the class I and class II fluids in the valves 64 and 98 and prevents undesirable mixing thereof.

The motor drive 100 can be operated to supply the selected fluid into the chamber 106 in a pulsating manner. This is accomplished by alternatingly moving the piston 112 such that the holes 104a and 108a are aligned with the ports for the selected fluid for a sufficient length of time for the fluid to fill the chamber 106, and then moving the piston 112 to a position in which all of the ports are blocked for a sufficient length of time for the fluid in the chamber 106 to perform a desired process step on an object in the chamber 106.

When moving between decks, the surface of the piston 112 is cleaned by the DI water in the grooves 122, 124, 126, 128, 136, 138, 140 and 142 as described above. In some applications it is required that DI water be prevented from entering the holes 104a and 108a and thereby the chamber 106. This may be accomplished by providing the grooves 122, 124, 126, 128, 136, 138, 140 and 142 with breaks which are sufficiently large that the holes 104a and 108a can move over the breaks and thereby cross the grooves without communicating with the grooves. This arrangement is illustrated in FIG. 11, in which the groove 122 is provided with a break 122a which is larger than the diameter of the hole 104a. The holes 62a and 94a communicate with the ends of the groove 122, thereby providing substantially zero dead volume.

Whereas the first and second directions of movement in the valves described above are rotation and translation respectively, the corresponding directions of movement in a valve 200 illustrated in FIGS. 14 to 21 are translation parallel to a plane in two orthogonal directions respectively.

The valve 200 includes a first valve member in the form of a block 202 having a flat surface 202a and a second valve member in the form of a block 204 having a flat surface 204a which sealingly and slidably mates with the surface 202a. The block 202 has first, second and third ports in the form of holes 206, 208 and 210 therethrough respectively. An elongated groove 212 is formed in the surface 202a of the first block 202 and communicates with the hole 206. The groove 212 extends vertically as viewed in FIG. 14 by a distance substantially equal to the distance between the holes 206 and 208. The block 204 has a fourth port in the form of a hole 214 therethrough.

Figure 14:
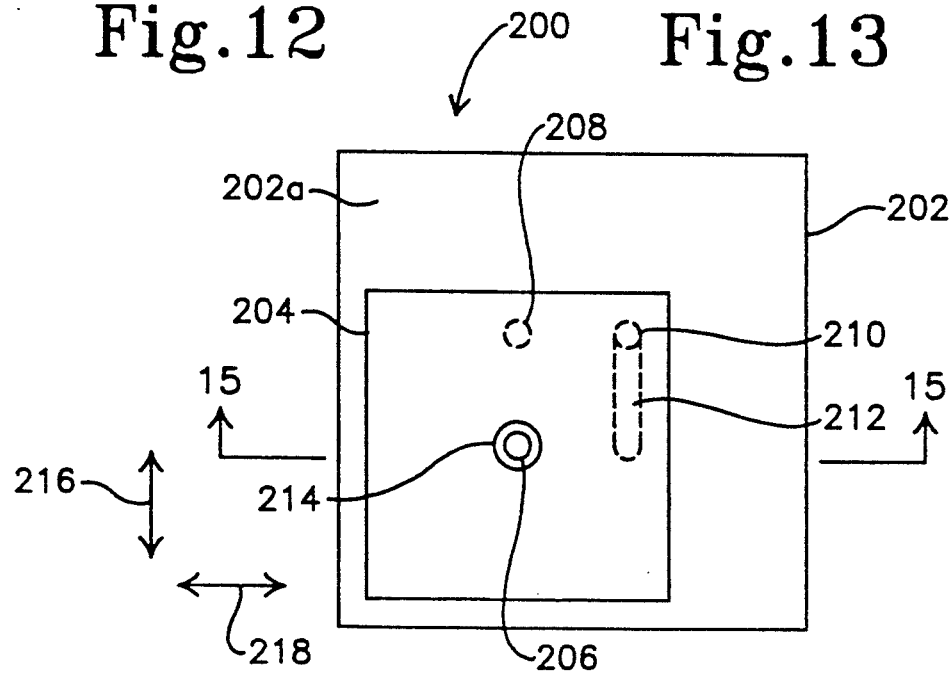
FIG. 14 is a plan view of second embodiment of a fluid supply valve according to the present invention in a first position.
Figure 15:
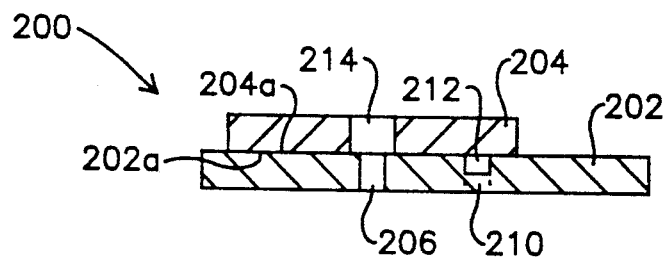
FIG. 15 is a section taken on a line 15—15 of FIG. 14.
Figure 16:
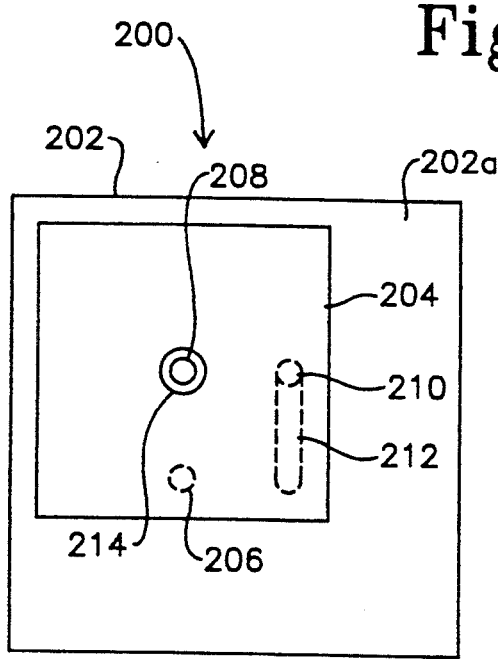
FIGS. 16 and 17 are similar to FIG. 14, but illustrate the valve in second and third positions respectively.

The block 204 is movable relative to the block 202 in first and second orthogonal directions parallel to the surfaces 202a and 204a as indicated by arrows 216 and 218 respectively. In a first position as illustrated in FIGS. 14 and 15, the hole 214 is aligned with and communicates with the hole 206. The block 204 is movable in the first direction 216 (upwardly) to a second position as illustrated in FIG. 16 in which the hole 214 communicates with the hole 208.

Figure 17:
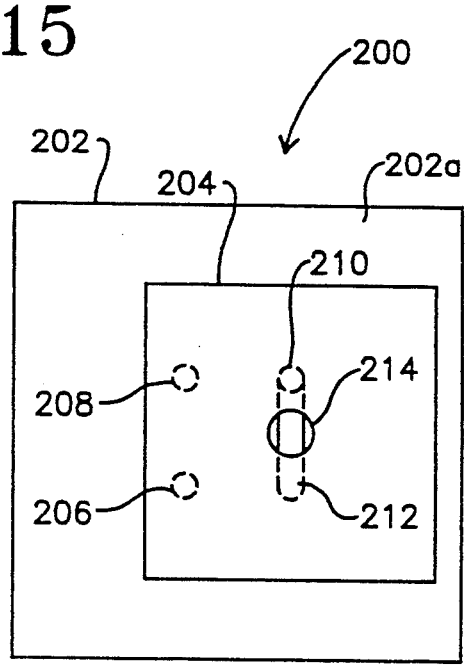

FIG. 17 illustrates the hole 214 as communicating with the groove 212 in a third position which is spaced between the holes 206 and 208 in the first direction 216. Movement of the block 204 in both the first and second directions 216 and 218 is required from the first position of FIG. 14 or the second position of FIG. 15 to the third position of FIG. 17.

It will be understood, however, that the hole 214 will communicate with the hole 210 through the groove 212 at any position in which the hole 214 communicates with the groove 212. For example, the hole 214 can be brought into communication with the hole 210 by moving the block 204 in the second direction 218 (rightwardly) from either the first position of FIG. 14 or the second position of FIG. 16 and vice-versa without movement in the first direction 216.

FIGS. 18 to 21 illustrate a valve 250 embodying the present invention which is constructed and operates using the principles of the valve 200 and can be used in the system 30 in place of the arrangement shown in FIGS. 9 to 13. The valve 250 includes a first block 252 and a second block 254 having a plurality of ports in the form of holes therethrough which are designated by the same reference numerals used in FIG. 8. The blocks 252 and 254 have mating surfaces which are sealingly slidable relative to each other in the first and second directions 216 and 218 respectively as described with reference to FIGS. 9 to 13.

The first block 252 includes a supply valve section 256 including the supply ports 50, 52, 54 and 56 for the class I fluids and the supply ports 58 and 60 for the class II fluids. The supply ports 58 and 60 are spaced from the supply ports 50, 52, 54 and 56 in the second direction 218 as illustrated. The supply port 63 for the nitrogen gas includes holes 258 and 260 formed through the block 252. Circular grooves 262 and 264 are formed in the surface of the block 252 which mates with the block 254. The grooves 262 and 264 are concentric with and communicate with the holes 258 and 260 respectively.

The DI water supply port 62 includes holes 266 and 268 formed through the block 252. Grooves 270 and 272 are formed in the mating surface of the block 252 and communicate with the holes 266 and 268 respectively. The groove 270 surrounds the class I fluid supply ports 50, 52, 54 and 56, but is formed with a break 270a having a labyrinth shape with a first section 270b extending in the first direction 216 and a second section 270c extending in the second direction 218. The groove 272 has the same shape as the groove 270, including a break 272a with sections 272b and 272c. The DI water effluent port 94 includes holes 274 and 276 which communicate with the grooves 270 and 272 respectively.

The block 254 has the outlet port 104 and inlet port 108 formed as holes therethrough which are spaced from each in the first direction 216 by a distance Δ1. The valve 250 further includes an effluent valve section 278 including the effluent ports 82, 84, 86 and 88 for the class I fluids which spaced from the supply ports 50, 52, 54 and 56 by the distance Δ1 in the first direction 216 respectively. Grooves 280, 282, 284 and 286 are formed in the mating surface of the block 252 and extend from the ports 82, 84, 86 and 88 partly toward the diagonally opposed ports 88, 86, 84 and 82 respectively.

The effluent ports 90 and 92 for the class II fluids are formed as holes through the block 252 and are spaced from the supply ports 58 and 62 by the distance Δ1 respectively in the first direction 216. Grooves 285 and 287 are formed in the mating surface of the block 252 and extend from the ports 90 and 92 partly toward the ports 92 and 90 respectively. The DI water supply port 62 further includes holes 288 and 290 formed through the block 252. Grooves 292 and 294 are formed in the mating surface of the block 252 and communicate with the holes 288 and 290 respectively. The groove 292 has the same shape as the groove 270 and is spaced therefrom by the distance Δ1 in the first direction 216, including a break 292a with sections 292b and 292c. The groove 242 has the same shape as the groove 272, is spaced therefrom by the distance Δ1 in the first direction 216 and includes a break 294a with sections 294b and 294c. The DI water effluent port 94 includes holes 296 and 298 which communicate with the grooves 292 and 294 respectively.

The grooves 292, 294, 270 and 272 spaced from the holes 82,84,86,88, 90,92, 50,52,54,56 and 58,60 respectively by a distance which is larger than the diameter of the holes 104 and 108, thereby enabling the holes 104 and 108 to pass between the grooves and holes. This prevents mixing of class I and class II fluids with DI water under all circumstances, and enables the fluids and DI water to be selected in any sequence.

In addition, the holes 58, 60, 90 and 92 and grooves 285 and 287 for the class II fluids may be shifted upwardly (in the direction of the arrow 216) by a distance Δ2 which is larger than the diameter of the holes 104 and 108 from the holes and grooves for the class I fluids as illustrated. This is a safety feature which prevents a transition between class I and class II fluids if the motor drive (not shown) which drives the block 254 in the direction of the arrow 218 "fails on", or cannot be turned off under normal computer control.

Figure 19:
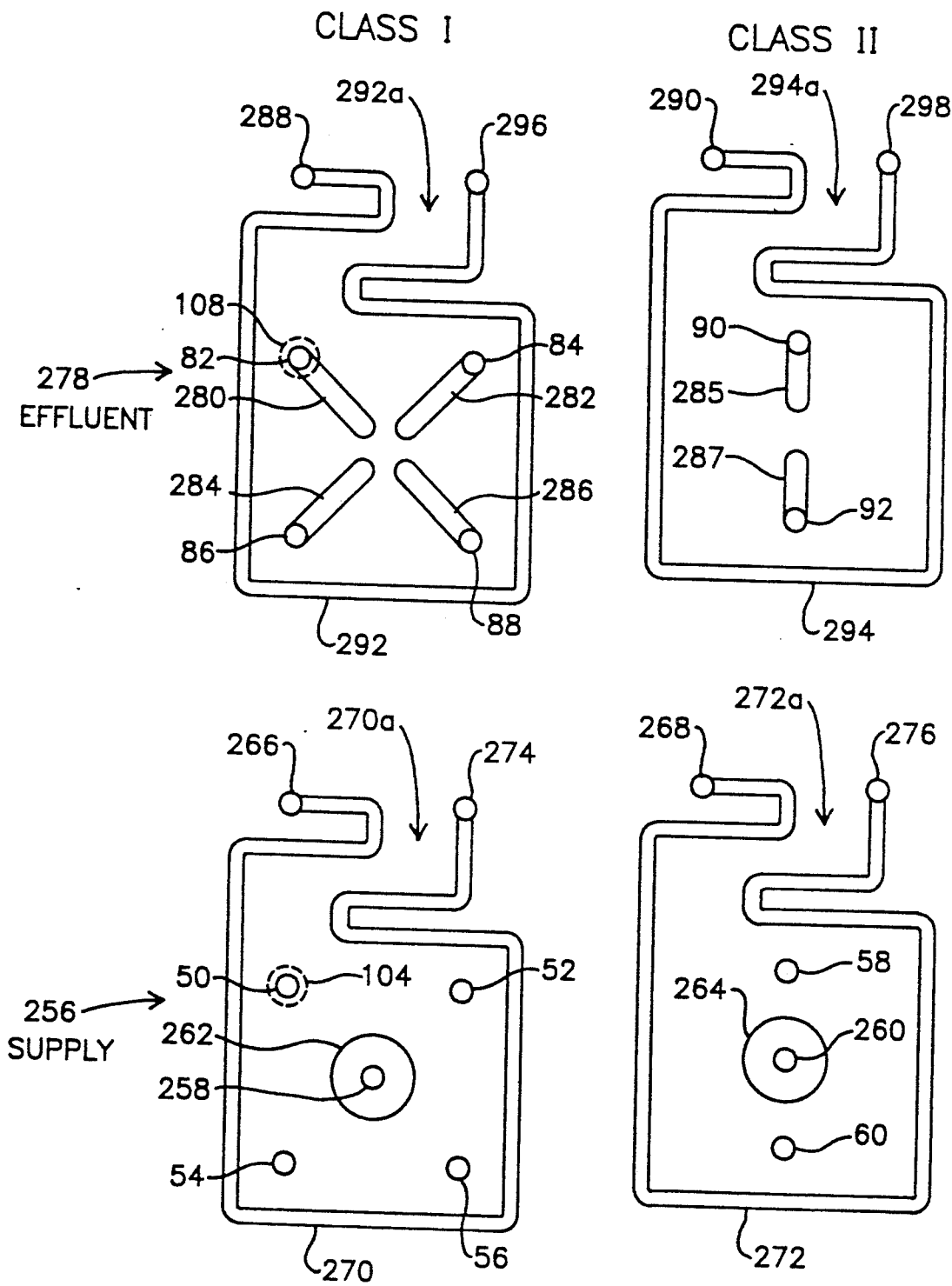
FIGS. 19 to 21 are diagrams illustrating the operation of the valve of FIG. 18 in different positions respectively.

The operation of the valve 250 will be described with reference to the diagrams of FIGS. 19 to 21, in which the block 254 is slidably and sealingly mounted on the block 252. In FIG. 19, the block 254 is positioned relative to the block 252 such that the outlet port 104 is aligned with and communicates with the supply port 50 and the inlet port 108 is aligned with and communicates with the effluent port 82. The containers 32 and 66 are thereby connected to the chamber 106 through the outlet port 104 and inlet port 108 respectively. The other class I fluids can be selected by moving the block 254 so that the outlet port 104 communicates with port 52, 54 or 56 and the inlet port 108 communicates with the port 84, 86 or 88 respectively.

Figure 20:
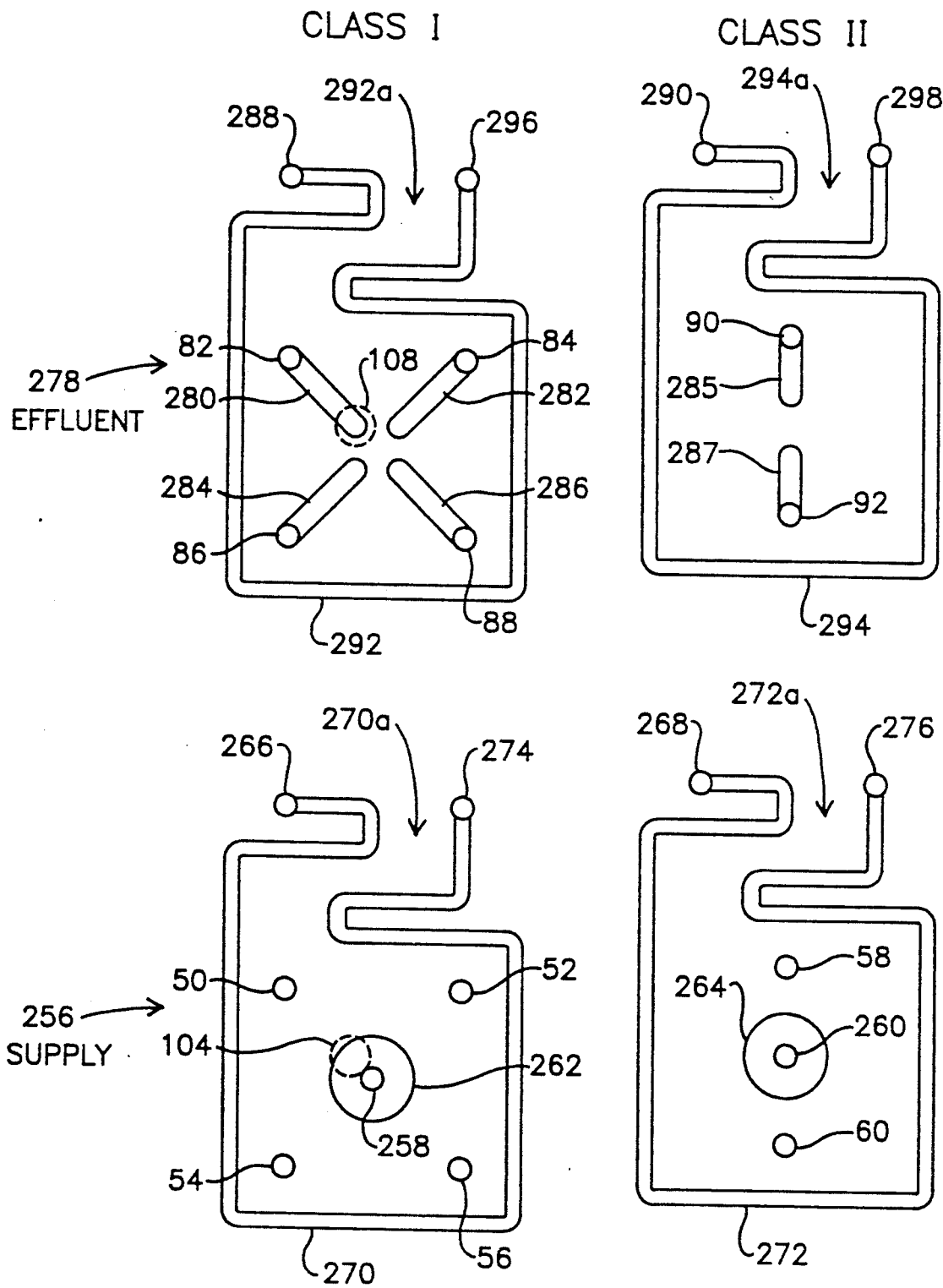

FIG. 20 illustrates the block 254 as being moved to a position such that the outlet port 104 communicates with the circular nitrogen groove 262 and the inlet port 108 communicates with the groove 280. In this case, nitrogen gas is supplied from the hole 258, groove 262 and port 104 into the chamber 106 to purge the same, and the residual fluid from the container 32 is discharged from the chamber 106 through the inlet port 108, groove 280 and port 82 to the effluent container 66. The grooves 262, 280, 282, 284 and 286 are dimensioned such that the nitrogen gas can be supplied from the groove 262 through the grooves 282, 284 and 286 in the same manner as through the groove 280.

Figure 21:
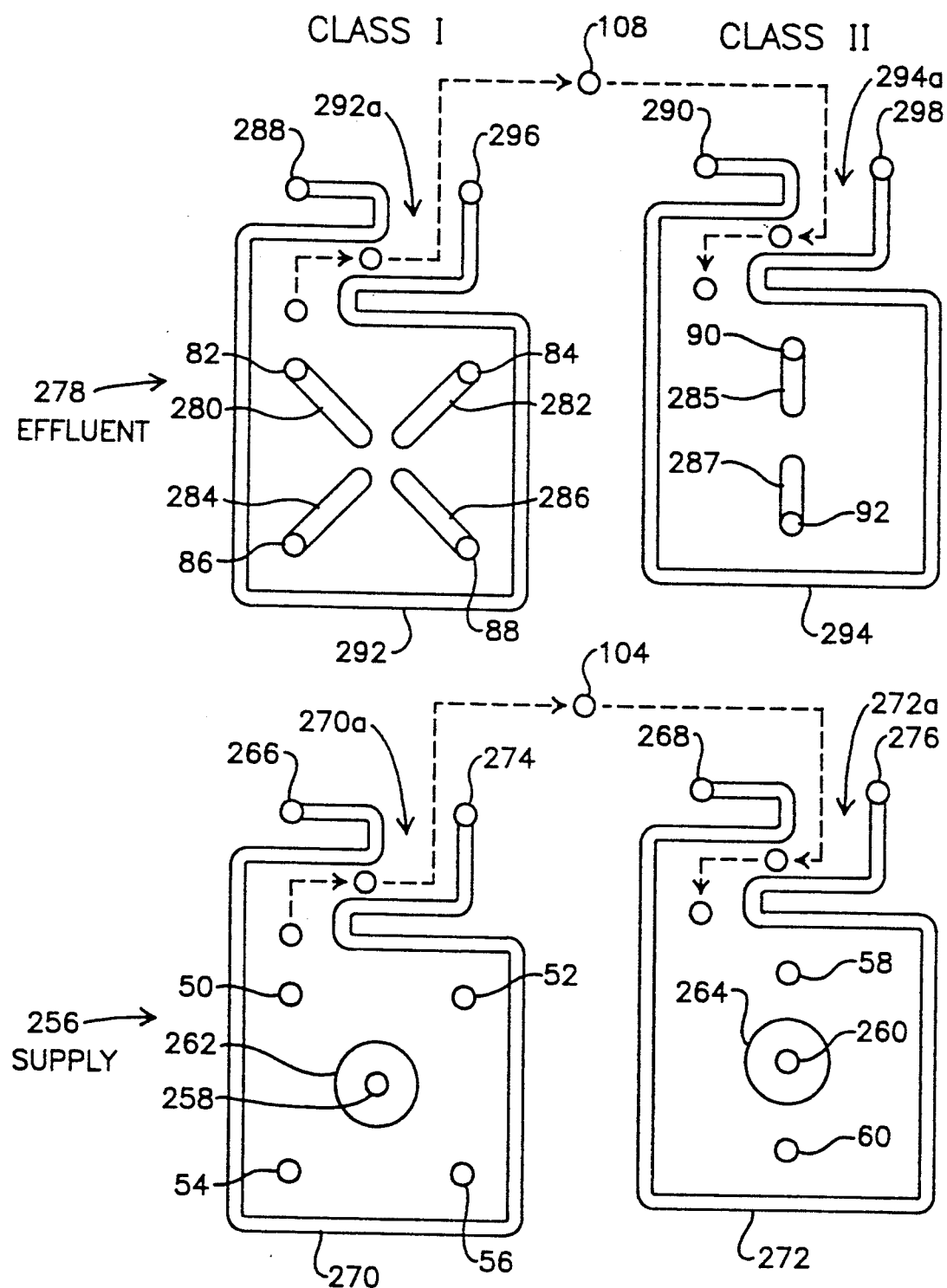

FIG. 21 illustrates movement of the block 254 such that the ports 104 and 108 move out of the grooves 270 and 292 and into the grooves 272 and 294 respectively as indicated by broken line paths. The breaks 270a, 272a, 292a and 294a are made wider than the diameter of the ports 104 and 108 so that the ports 104 and 108 will not communicate with the grooves 270, 272, 292 and 294 while moving through the respective breaks 270a, 272a, 292a and 294a.

Movement of the block 254 relative to the block 252 creates "snail traces" consisting of fluid from the supply and effluent ports to be formed on the surface of the block 254. The DI water in the grooves 270, 272, 292 and 294 cleans the surface of the block 254. The grooves 270, 272, 292 and 294 can be considered as "snail trace cleaners". The labyrinth shape of the breaks 270a, 272a, 292a and 294a with sections in the two directions 216 and 218 enables the surface of the block 254 to be completely cleaned without the ports 104 and 108 communicating with the DI water in the grooves 270, 272, 292 and 294. It will be noted that the breaks 270a, 272a, 292a and 294a can be omitted and the grooves 270, 272, 292 and 294 made continuous if communication of the ports 104 and 108 with the grooves is permissible.

Once inside the grooves 272 and 294, the ports 104 and 108 are able to communicate with the ports 58,60 and 90,92 respectively for the class II fluids in the same manner as for the class I fluids as described above. The ports 104 and 108 are further able to communicate with the groove 264 and grooves 285,287 for the nitrogen gas in the manner described above.

While several illustrative embodiments of the invention have been shown and described, numerous variations and alternate embodiments will occur to those skilled in the art, without departing from the spirit and scope of the invention.

Figure 22:
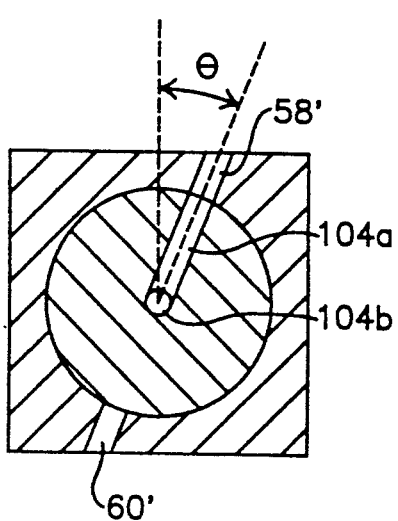
FIG. 22 is a sectional view illustrating a modification of the arrangement of FIG. 13.
Figure 23:
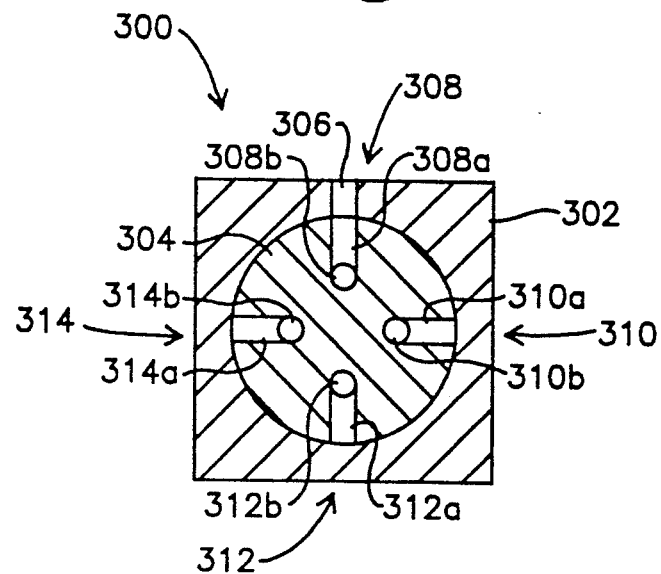
FIG. 23 is a sectional view of a modified embodiment of the present invention including a reversed arrangement of ports in a cylinder and piston.
Figure 18:
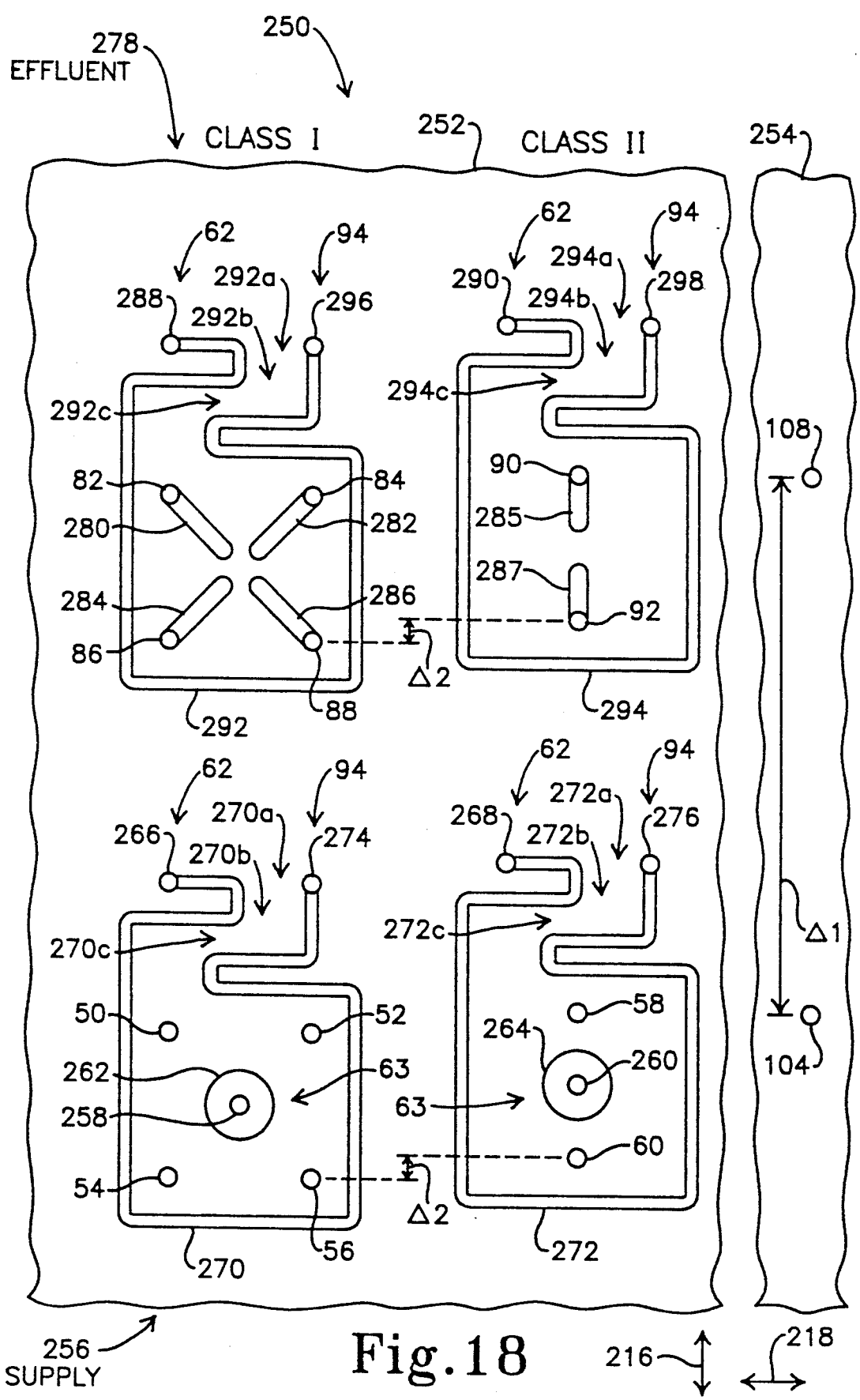
FIG. 18 is a fragmentary disassembled plan view of a second embodiment of a tandem supply and effluent valve for the system of FIG. 8.

For example, FIG. 22 illustrates a modification of the valve 109 illustrated in FIGS. 9 to 13, in which the ports for the class II fluids are rotated from the ports for the class I fluids by a circumferential distance which is larger than the diameter of the radial holes 104a and 108a. As illustrated, supply ports 58' and 60' for the class II fluids are rotated by an angle $\theta$ from the positions of the ports 58 and 60 illustrated in FIG. 13. Although not specifically illustrated, the effluent ports for the class II fluids are rotated in the same manner. This is a safety feature which prevents a transition between class I and class II fluids if the axial motor drive "fails on", or cannot be turned off under normal computer control FIG. 23 illustrates another valve 300 embodying the present invention including a cylinder 302 and a piston 304. The cylinder 302 is formed with a single port 306. The piston 304 is formed with four ports 308, 310, 312 and 314, including axially aligned, rotationally spaced radial holes 308a, 310a, 312a and 314a which communicate with longitudinal holes 308b, 310b, 312b and 314b respectively. The port 306 can be brought into communication with a selected one of the ports 308, 310, 312 and 314 by relative rotation between the cylinder 302 and piston 304.

Accordingly, it is intended that the present invention not be limited solely to the specifically described illustrative embodiments. Various modifications are contemplated and can be made without departing from the spirit and scope of the invention as defined by the appended claims.

We claim:

1. A valve comprising:
   a first valve member having a first port, a second port which is spaced from the first port in a first direction and a third port which is spaced from the first port in a second direction; and
   a second valve member which sealingly and slidingly engages with the first valve member and has a fourth port;
   the second valve member being movable relative to the first valve member in the first direction between a first position in which the fourth port communicates with the first port and a second position in which the fourth port communicates with the second port; and in the second direction between the first position and a third position in which the fourth port communicates with the third port;
   the first valve member further having an elongated fifth port having a labyrinth shape and formed with a break such that the fourth port crosses the fifth port when moving between the first and third ports and when moving between the second and third ports and such that the fourth port can cross said break without communicating with the fifth port.

2. A valve as in claim 1, in which the third port is also spaced from the first port in the first direction such that the second valve member moves relative to the first valve member in both the first and second directions between the first position and the third position.

3. A valve as in claim 2, in which the second port is also spaced from the first port in the second direction such that the second valve member moves relative to the first valve member in both the first and second directions between the first position and the second position.

4. A valve as in claim 1, in which the third port is elongated in the first direction such that the second valve member is movable relative to the first valve member in the second direction between the second position and a fourth position in which the fourth port communicates with the third port.

5. A valve as in claim 1, in which:
the first valve member comprises a cylinder having a bore with an axis;
the second valve member comprises a piston which is coaxially received in the bore;
the first direction is rotation of the piston about said axis; and
the second direction is translation of the piston along said axis.

6. A valve as in claim 5, in which:
the first, second and third ports comprise holes which extend through the cylinder and open into the bore; and
fourth port comprises a radial hole which extends through the piston and opens into the bore, and an axial hole which extends through the piston and communicates with the radial hole.

7. A valve as in claim 1, in which:
the first valve member comprises a first block having a flat first surface;
the second valve member comprises a second block having a flat second surface which mates with said first surface; and
the first and second directions are translation of the second block relative to the first block parallel to said first and second surfaces in first and second orthogonal directions respectively.

8. A valve as in claim 7, in which:
the first, second, third and fifth ports comprise holes which extend through the first block and open through said first surface; and
the fourth port comprises a hole which extends through the second block and opens through said second surface.

9. A valve as in claim 1, in which said labyrinth shape includes a first section extending in the first direction and a second section extending in the second direction.

10. A valve as in claim 1, in which the second valve member is further movable relative to the first valve member to a fourth position in which the first, second, third and fourth ports are blocked.

11. A system as in claim 1, in which:
the first valve member comprises a cylinder having a bore with an axis;
the second valve member comprises a piston which is coaxially received in the bore;
the first direction is rotation of the piston about said axis; and
the second direction is translation of the piston along said axis.

12. A system as in claim 11, in which:
the first, second and third ports comprise holes which extend through the cylinder and open into the bore; and
fourth port comprises a radial hole which extends through the piston and opens into the bore, and an axial hole which extends through the piston and communicates with said inlet and the radial hole.

13. A system for selectively supplying and removing fluids from a chamber having an inlet and an outlet comprising:
a first valve member having first, second, third, fourth, and fifth ports spaced apart from one another, said first port communicating with a first supply container for a first fluid, said second port communicating with a second supply container for a second fluid, said third port communicating with a first effluent container for said first fluid, said fourth port communicating with a second effluent container for said second fluid, and said fifth port communicating with a third supply container for a purging fluid;
a second valve member which sealingly engages with the first valve member and has sixth and seventh ports that communicate with the inlet and outlet, respectively, of said chamber;
said ports being configured and located so that said second valve member is movable relative to said first valve member sequentially between:
a first position in which said first port communicates with said sixth port while said third port communicates with said seventh port;
a second position in which said first port does not communicate with said sixth port but said fifth port communicates with said sixth port while said third port communicates with said seventh port;
a third position in which said second port communicates with said sixth port while said fourth port communicates with said seventh port; and
a fourth position in which said second port does not communicate with said sixth port but said fifth port communicates with said sixth port while said fourth port communicates with said seventh port.

14. A valve system as in claim 13 wherein said fifth port has an elongated pattern.

15. A valve system as in claim 14 wherein said third and fourth ports also have elongated portions.

16. A valve system as in claim 14 in which the fifth port is formed with a break and said second member is movable relative to said first member between said first and third positions without going through said second position.

17. A system as in claim 16, in which said break has a labyrinth shape.

18. A system as in claim 17, in which said labyrinth shape includes a first section extending in a first direction and a second section extending in a second direction.

19. A system as in claim 13, in which:
the first valve member comprises a first block having a flat first surface in which said first through fifth ports are located;
the second valve member comprises a second block having a flat second surface in which said sixth and seventh ports are located and which mates with said first surface; and
the second valve member is movable relative to the first valve member by translation of the second block relative to the first block parallel to said first and second surfaces.

20. A system as in claim 19, in which:
the first, second, third, fourth and fifth ports comprise holes which extend through the first block and open through said first surface; and
the sixth and seventh ports comprise holes which extend through the second block, communicate with said inlet and outlet, respectively and open through said second surface.

21. A system as in claim 13, further comprising motor drive means for selectively moving the second valve member relative to the first valve member respectively between the first, second, third and fourth positions.

22. A system for selectively providing fluids to an enclosed material object comprising:
- a chamber for enclosing said material object, said chamber having an inlet and an outlet:
- a first valve member having first, second, third, fourth, and fifth ports spaced apart from one another, said first port communicating with a first supply container for a first fluid, said second port communicating with a second supply container for a second fluid, said third port communicating with a first effluent container for said first fluid, said fourth port communicating with a second effluent container for said second fluid, and said fifth port communicating with a third supply container for a purging fluid;
- a second valve member which sealingly engages with the first valve member and has sixth and seventh ports that communicate with the inlet and outlet, respectively, of said chamber;
- said ports being configured and located so that said second valve member is movable relative to said first valve member between:
  - a first position in which said first port communicates with said sixth port while said third port communicates with said seventh port;
  - a second position in which said first port does not communicate with said sixth port but said fifth port communicates with said sixth port while said third port communicates with said seventh port;
  - a third position in which said second port communicates with said sixth port while said fourth port communicates with said seventh port; and
  - a fourth position in which said second port does not communicate with said sixth port but said fifth port communicates with said sixth port while said fourth port communicates with said seventh port;
- a drive for moving said first and second valve members sequentially between said first, second, third and fourth positions.

* * * * *